US011204295B2

(12) United States Patent
Kappeller

(10) Patent No.: US 11,204,295 B2
(45) Date of Patent: Dec. 21, 2021

(54) INTERNAL COMBUSTION ENGINE FOR A MOTOR VEHICLE, IN PARTICULAR FOR AN AUTOMOBILE, AND MOTOR VEHICLE

(71) Applicant: Bayerische Motoren Werke Aktiengesellschaft, Munich (DE)

(72) Inventor: Christian Kappeller, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/048,192

(22) PCT Filed: Jun. 11, 2019

(86) PCT No.: PCT/EP2019/065140
§ 371 (c)(1),
(2) Date: Oct. 16, 2020

(87) PCT Pub. No.: WO2020/007575
PCT Pub. Date: Jan. 9, 2020

(65) Prior Publication Data
US 2021/0172820 A1    Jun. 10, 2021

(30) Foreign Application Priority Data

Jul. 6, 2018 (DE) ...................... 10 2018 211 169.3

(51) Int. Cl.
*G01L 23/00* (2006.01)
*G01L 23/22* (2006.01)
(Continued)

(52) U.S. Cl.
CPC .......... *G01L 23/221* (2013.01); *F02B 77/085* (2013.01); *F02B 2075/1816* (2013.01)

(58) Field of Classification Search
CPC ........... F02B 77/085; F02B 2075/1816; G01L 23/221
See application file for complete search history.

(56) References Cited

U.S. PATENT DOCUMENTS 4,382,377 A * 5/1983 Kleinschmidt ....... G01L 23/222
73/35.13
4,408,479 A * 10/1983 Asai ...................... G01L 23/222
310/326
(Continued)

FOREIGN PATENT DOCUMENTS

DE    31 48 452 A1    7/1983
DE    34 29 217 A1    2/1986
(Continued)

OTHER PUBLICATIONS

International Search Report (PCT/ISA/210) issued in PCT Application No. PCT/EP2019/065140 dated Jul. 30, 2019 with English translation (five (5) pages).
(Continued)

*Primary Examiner* — Phutthiwat Wongwian
*Assistant Examiner* — Sherman D Manley
(74) *Attorney, Agent, or Firm* — Crowell & Moring LLP

(57) ABSTRACT

An internal combustion engine has at least one cylinder wall forming a cylinder, and at least one knock sensor held on a housing element. The knock sensor is fixed to a fastening point of the housing element. An intermediate chamber is provided in the radial direction of the cylinder between at least one section of the cylinder wall and the fastening point of the housing element arranged on a side of the cylinder wall facing away from the cylinder, a distance extending at least in the radial direction of the cylinder being provided as a result. At least one sound transmission bridge extends in the intermediate chamber, bridging the distance from the cylinder wall continuously to the fastening point, via which vibrations, on the basis of which knocking combustion can be detected by the knock sensor, are transferrable from the cylinder wall to the fastening point.

13 Claims, 1 Drawing Sheet

(51) Int. Cl.
*F02B 77/08* (2006.01)
*F02B 75/18* (2006.01)

(56) References Cited

U.S. PATENT DOCUMENTS

| | | | | | |
|---|---|---|---|---|---|
| 4,422,323 | A | * | 12/1983 | Linder | F02B 77/085 |
| | | | | | 73/114.09 |
| 4,450,709 | A | * | 5/1984 | Hayashi | G01L 23/221 |
| | | | | | 73/35.09 |
| 4,468,950 | A | * | 9/1984 | Ishigami | F02B 77/085 |
| | | | | | 73/35.09 |
| 4,517,945 | A | * | 5/1985 | Ishigami | G01L 23/221 |
| | | | | | 123/193.2 |
| 4,601,196 | A | * | 7/1986 | Frelund | G01L 23/10 |
| | | | | | 73/114.18 |
| 4,903,646 | A | | 2/1990 | Minagawa et al. | |
| 5,230,238 | A | * | 7/1993 | Takeuchi | G01L 23/222 |
| | | | | | 73/35.11 |
| 6,532,737 | B1 | * | 3/2003 | Kozerski | F01N 13/008 |
| | | | | | 60/323 |
| 9,464,956 | B2 | * | 10/2016 | Nakajima | F02B 77/085 |
| 2004/0208725 | A1 | | 10/2004 | Bader et al. | |
| 2005/0076860 | A1 | * | 4/2005 | Tomita | F02B 77/085 |
| | | | | | 123/41.74 |
| 2011/0239749 | A1 | * | 10/2011 | Toth | G01L 23/08 |
| | | | | | 73/114.18 |
| 2013/0042674 | A1 | * | 2/2013 | Toth | F16J 15/064 |
| | | | | | 73/114.18 |
| 2015/0149066 | A1 | * | 5/2015 | Moetakef | F02B 77/085 |
| | | | | | 701/111 |

FOREIGN PATENT DOCUMENTS

| | | |
|---|---|---|
| DE | 41 11 533 A1 | 10/1991 |
| DE | 20 2014 105 470 U1 | 1/2015 |
| DE | 10 2010 034 459 B4 | 7/2015 |
| EP | 0 079 042 A1 | 5/1983 |
| EP | 1 421 264 B1 | 9/2005 |
| JP | 57-34417 A | 2/1982 |
| JP | 57-83239 U | 5/1982 |

OTHER PUBLICATIONS

German-language Written Opinion (PCT/ISA/237) issued in PCT Application No. PCT/EP2019/065140 dated Jul. 30, 2019 (five (5) pages).

German-language Search Report issued in German Application No. 10 2018 211 169.3 dated Feb. 27, 2019 with partial English translation (13 pages).

* cited by examiner

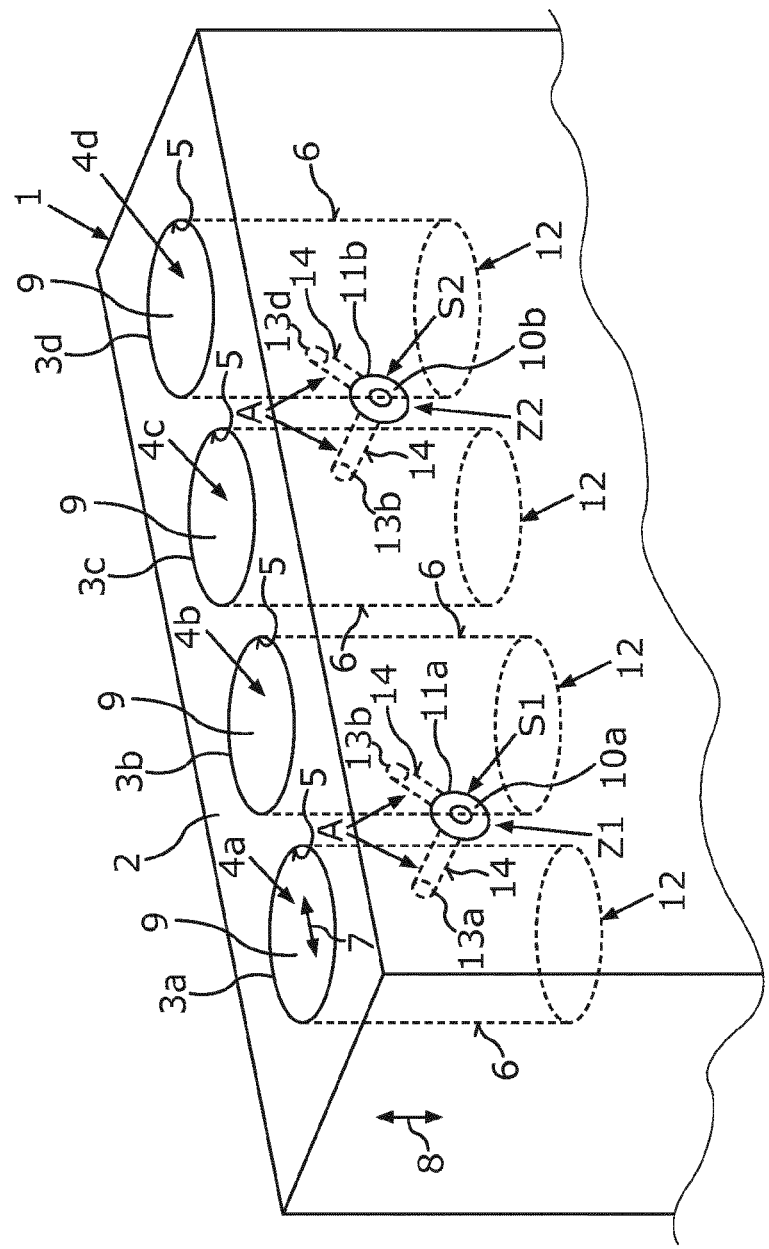

INTERNAL COMBUSTION ENGINE FOR A MOTOR VEHICLE, IN PARTICULAR FOR AN AUTOMOBILE, AND MOTOR VEHICLE

BACKGROUND AND SUMMARY OF THE INVENTION

The invention relates to an internal combustion engine for a motor vehicle, in particular for an automobile. The invention furthermore relates to a motor vehicle, in particular an automobile, with at least one such internal combustion engine.

Such internal combustion engines for motor vehicles, in particular for automobiles, have already long been known from the general prior art. The respective internal combustion engine is formed, for example, as a reciprocating engine and has at least one cylinder wall which forms a cylinder of the internal combustion engine. In the fully produced state of the internal combustion engine, a piston is normally received in the cylinder in a translationally movable manner. The internal combustion engine furthermore comprises at least one knock sensor retained on a housing element of the internal combustion engine, by means of which knock sensor knocking combustions which occur in the cylinder can be detected.

DE41 11 533 A1 furthermore discloses a knock sensor device for detecting a knocking vibration of an internal combustion engine which comprises a cylinder block and a cylinder head.

EP 1 421 264 B1 discloses a device with a fastening device for a sensor and with at least one locking screw for screwing into a first threaded bore of a housing or housing part of the device. A method for detecting knocking combustions can furthermore be inferred as known from DE10, 2010/034,459 B4.

The object of the present invention is to create an internal combustion engine and a motor vehicle so that a particularly advantageous knock sensor link can be realized.

This object is achieved by an internal combustion engine as well as by a motor vehicle in accordance with the independent claims. Advantageous configurations of the invention are the subject matter of the dependent claims.

A first aspect of the invention relates to an internal combustion engine for a motor vehicle, in particular for an automobile motor car such as, for example, a passenger automobile. The internal combustion engine has in this case at least one cylinder wall, which forms or delimits a cylinder of the internal combustion engine, formed, for example, as a reciprocating engine. In particular, the cylinder is formed or delimited by an inner circumferential-side shell surface of the cylinder wall facing the cylinder in the radial direction of the cylinder, in particular directly. For example, in the fully produced state of the internal combustion engine, a piston of the internal combustion engine is received in the cylinder in a translationally movable manner, as a result of which the piston can move translationally to and fro in the cylinder. The cylinder wall, in particular its inner circumferential-side shell surface, forms a track for the piston which can be supported in the radial direction of the piston and thus in the radial direction of the cylinder on the track.

Moreover, the internal combustion engine comprises at least one knock sensor retained on a housing element of the internal combustion engine, by means of which knock sensor knocking combustions which occur in the cylinder can be detected. The housing element and the knock sensor are, for example, two components which are formed separately from one another and connected to one another.

In order now to be able to realize a particularly advantageous knock sensor link, i.e. a particular advantageous link of the knock sensor to the housing element, it is provided according to the invention that the knock sensor is fastened to a fastening point of the housing element. This means that the knock sensor is fastened to the housing element in a fastening region of the housing element. In this case, an intermediate space is arranged or provided in the radial direction of the cylinder between at least one sub-region of the cylinder wall, in particular between at least one sub-region of an outer circumferential-side shell surface of the cylinder wall which faces away from the inner circumferential-side shell surface in the radial direction of the cylinder and the fastening point of the housing element which is arranged on a side of the cylinder wall facing away from the cylinder and which is thus arranged on the side of the outer circumferential-side shell surface on the cylinder wall. As a result of this, a distance running at least in the radial direction of the cylinder is provided in the radial direction of the cylinder between at least the sub-region and the fastening point. The internal combustion engine according to the invention furthermore comprises at least one sound transmission bridge which extends continuously up to the fastening point in the intermediate space while bridging the distance from the cylinder wall. In other words, the sound transmission bridge extends continuously in the intermediate space and thereby from the cylinder wall, in particular from the outer circumferential-side shell surface of the cylinder wall, up to the housing element, in particular up to a second inner circumferential-side shell surface of the housing element facing the outer circumferential-side shell surface of the cylinder wall, as a result of which the distance between the cylinder wall and the housing element, in particular between the outer circumferential-side shell surface of the cylinder wall and the second inner circumferential-side shell surface of the housing element, is bridged by the sound transmission bridge. Vibrations, on the basis of which knocking combustions which occur in the cylinder can be detected by means of the knock sensor, can be transmitted from the cylinder wall to the fastening point and thus to the knock sensor via the sound transmission bridge, which is also simply referred to as a bridge, web or sound transmission web. This means that the sound transmission bridge enables a particularly advantageous vibration or sound transmission from the cylinder wall to the fastening point and thus to the knock sensor.

As a result, the knock sensor can, for example, be positioned and fastened to the housing element flexibly or in particular according to requirements, in particular relative to the housing element and relative to the cylinder wall so that, for example, installation space problems can be avoided and particularly simple production of the internal combustion engine can be represented.

As a result of the use of the sound transmission bridge, the knock sensor can, for example, also be fastened to such fastening points of the housing element which are not normally suitable without use of the sound transmission bridge in order to be able to detect knocking combustions which occur in the cylinder by means of the knock sensor. The sound transmission bridge enables a direct transmission of sound between the cylinder wall and the knock sensor so that knocking events in the cylinder can be detected particularly well and reliably by means of the knock sensor. As a result of this, for example, particularly early ignition times or ignition angles can be realized so that a particularly efficient and thus low fuel consumption operation of the internal combustion engine can be realized.

For example, the knock sensor is fastened by screws to the housing element so that, for example, the knock sensor is screwed to the housing element. For this purpose, for example, a screw boss is provided at the fastening point, with which screw boss the knock sensor is screwed. In particular, the knock sensor is screwed at least partially into the screw boss. An at least substantially direct transmission of sound from the cylinder wall to the screw boss and thus to the knock sensor can be ensured by means of the sound transmission bridge so that knocking events in the cylinder can be detected particularly precisely by means of the knock sensor. The screw boss and thus the knock sensor can furthermore be positioned particularly advantageously in order to be able to mount or install, for example, the knock sensor particularly easily.

In particular, a direct material connection or a direct contact is provided on one hand between the sound transmission bridge and the cylinder wall and on the other hand between the sound transmission bridge and the fastening point in order as a result to be able to ensure a particularly advantageous transmission of sound. Since the housing element and/or the cylinder wall and/or the sound transmission bridge is/are preferably produced by molding, in particular by casting, a configuration suitable for molding, in particular casting, in particular of the sound transmission bridge is advantageous in order to be able to avoid, for example, the use of lost cores. In particular, the cylinder wall and/or the sound transmission bridge and/or the housing element can be formed from a lightweight metal, in particular from aluminum.

In the case of one advantageous embodiment of the invention, the sound transmission bridge has at least one length region, the outer circumferential-side shell surface of which is spaced apart in the circumferential direction of the sound transmission bridge fully circumferentially both from the housing element, in particular from the second inner circumferential-side shell surface of the housing element, and from the cylinder wall, in particular from the outer circumferential-side shell surface of the cylinder wall. In order to be able to differentiate between the outer circumferential-side shell surface of the length region of the sound transmission bridge clearly in terms of terminology from the outer circumferential-side shell surface of the cylinder wall, the outer circumferential-side shell surface of the length region of the sound transmission bridge is also referred to as the second outer circumferential-side shell surface. It is preferably provided that the sound transmission bridge is connected at least in a sound-transmitting manner or is in contact exclusively with the cylinder wall, in particular with the outer circumferential-side shell surface of the cylinder wall, and with the housing element, in particular with the second inner circumferential-side shell surface of the housing element so that, apart from respective regions or points of the sound transmission bridge which is connected at least in a sound-transmitting manner at the regions or points to the cylinder wall and to the housing element, the complete outer circumferential-side shell surface of the sound transmission bridge is spaced apart both from the cylinder wall and from the housing element. As a result of this, particularly advantageous and precise as well as defined sound transmission between the cylinder wall and the housing element and thus between the cylinder wall and the knock sensor can be ensured so that knocking events can be precisely detected.

A further embodiment is characterized in that the sound transmission bridge runs in a straight line, in particular over its complete extent which runs from the cylinder wall to the fastening point. As a result of this, a particularly advantageous transmission of sound or vibration can be ensured.

In a further, particularly advantageous configuration of the invention, the intermediate space is at least a part of a cooling jacket through which a cooling fluid can flow to cool the cylinder wall. The cooling fluid is, for example, a cooling liquid which has at least water. The cooling liquid is thus also referred to as cooling water so that the cooling jacket is also referred to as a water jacket.

For example, the sound transmission bridge is produced by casting. It is furthermore conceivable that the cylinder wall and/or the housing element are produced by casting. It is furthermore conceivable that the sound transmission bridge is formed in one piece with the cylinder wall and/or in one piece with the housing element so that, for example, the sound transmission bridge is produced by gas casting by which the cylinder wall or the housing element are also produced. For example, the sound transmission bridge is cast into the intermediate space. As a result of this, particularly advantageous sound or vibration transmission can be realized.

In the case of a further embodiment of the invention, the internal combustion engine has a second cylinder wall which forms a second cylinder of the internal combustion engine, wherein there are provided in the radial direction of the second cylinder between at least a second sub-region of the second cylinder wall and the fastening point of the housing element arranged on a side of the second cylinder wall facing away from the second cylinder a second intermediate space and as a result a second distance running at least in the radial direction of the second cylinder. Here, there is provided at least a second sound transmission bridge extending, while bridging the second distance, from the second cylinder wall continuously up to the fastening point in the second intermediate space, via which sound transmission bridge vibrations can be transmitted from the second cylinder wall to the fastening point, on the basis of which vibrations knocking combustions which occur in the second cylinder can be detected by means of the knock sensor. The previous and following statements in relation to the first cylinder wall can also be readily applied to the second cylinder wall and vice versa. The previous and following statements in relation to the first sound transmission bridge can furthermore also be readily applied to the sound transmission bridge and vice versa.

As a result of the use of the second sound transmission bridge, knocking events can be detected particularly precisely by means of the same knock sensor both in the first cylinder and in the second cylinder so that the number of parts and thus the costs and the weight of the internal combustion engine can be kept to a particularly low level.

It has been shown to be particularly advantageous if the intermediate spaces are fluidically connected to one another and are respective parts of the cooling jacket.

Finally, it has been shown to be particularly advantageous if the housing element is formed as a crank housing of the internal combustion engine.

A second aspect of the invention relates to a motor vehicle preferably formed as an automobile, in particular as a passenger automobile, which motor vehicle comprises at least one internal combustion engine according to the invention according to the first aspect of the invention. Advantages and advantageous configurations of the first aspect of the invention are to be regarded as advantages and advantageous configurations of the second aspect of the invention and vice versa.

Further details of the invention will become apparent from the following description of one preferred exemplary embodiment with the associated drawing.

BRIEF DESCRIPTION OF THE DRAWING

The single FIGURE shows in section a schematic perspective view of an internal combustion engine according to the invention.

DETAILED DESCRIPTION OF THE DRAWING

The single FIGURE shows, in section, in a schematic passenger automobile an internal combustion engine 1 formed as a reciprocating engine for a motor vehicle, in particular for an automobile such as, for example, a passenger automobile. The motor vehicle can be driven here by means of internal combustion engine 1. Internal combustion engine 1 comprises a housing element 2 in the form of a crank housing which is also referred to as a cylinder crank housing. Internal combustion engine 1 furthermore comprises several cylinder walls 3a-d by which respective cylinders 4a-d are formed or restricted. It is apparent from the FIGURE that cylinders 4a-d are arranged behind one another or consecutively and in this case in rows so that internal combustion engine 1 is formed, for example, as an in-line engine. The above and following statements can, however, also be readily applied to other designs of internal combustion engines. In particular, respective cylinder wall 3a-d has an inner circumferential-side shell surface 5 by which respective cylinder 4a-d is formed or delimited, in particular directly. Respective cylinder wall 3a-d furthermore has, for example, an outer circumferential-side shell surface 6 which faces respective inner circumferential-side shell surface 5 in the radial direction of respective cylinder 4a-d. The respective radial direction of respective cylinder 4a-d is illustrated by a double arrow 7 using the example of cylinder 4a. Moreover, the respective axial direction of respective cylinder 4a-d is illustrated by a double arrow 8 in the present case using the example of cylinder 4a.

In the fully manufactured state of internal combustion engine 1 formed as a reciprocating engine, a piston, not represented in the FIGURE, is received in a translationally movable manner in respective cylinder 4a-d so that the respective piston can move translationally to and fro in the axial direction of respective cylinder 4a-d relative to respective cylinder wall 3a-d. Respective cylinder wall 3a-d, in particular respective inner circumferential-side shell surface 5, forms a respective track 9 for the respective piston which can be supported along its radial direction on respective track 9. The radial direction of the respective piston coincides with the radial direction of respective cylinder 4a-d.

Respective cylinder wall 3a-d is arranged, for example, at least partially, in particular at least primarily or completely, in housing element 2. It is in particular conceivable that respective cylinder wall 3a-d is formed in one piece with housing element 2. In the fully produced state of internal combustion engine 1, the pistons are coupled in an articulated manner with an output drive shaft of internal combustion engine 1 formed as a crank shaft and not represented in the FIGURE. The drive output shaft is mounted rotatably at least indirectly on housing element 2 about an axis of rotation relative to housing element 2. As a result of the articulated coupling of the pistons to the output drive shaft, the respective translational movements of the pistons can be converted into a rotational movement of the output drive shaft about its axis of rotation.

Internal combustion engine 1 furthermore comprises knock sensors 10a, b which are formed separately from housing element 2 and fastened to and thus retained on housing element 2. Knocking combustions which occur in cylinders 4a, d can be detected by means of knock sensors 10a, b.

In order to now be able to realize a particularly advantageous linking of respective knock sensor 10a, b to housing element 2, respective knock sensor 10a, b is fastened to a respective fastening point S1 or S2 of housing element 2. Respective knock sensor 10a, b is fastened by screws to housing element 2. For this purpose, a screw boss 11a, b is provided at respective fastening point S1 or S2, with which screw boss 11a, b respective knock sensor 10a, b is screwed. In particular, respective knock sensor 10a, b is screwed at least partially into respective screw boss 11a, b.

It is apparent from the FIGURE that housing element 2 is arranged at least partially, in particular at least primarily or entirely, on a respective side 12 of respective cylinder wall 3a, d facing away from respective cylinder 4a, d in particular in the radial direction of respective cylinder 4a, d. A respective intermediate space Z1 or Z2 is arranged and thus provided in the radial direction of respective cylinder 4a-d between at least a respective sub-region of respective cylinder wall 3a-d under respective fastening point S1 or S2, in particular between at least a sub-region of respective outer circumferential-side shell surface 6 and respective fastening point S1 or S2. Intermediate spaces Z1 and Z2 are, for example, fluidically connected to one another, wherein intermediate spaces Z1 and Z2 are, for example, respective parts of a cooling jacket through which a cooling fluid can flow for cooling cylinder walls 3a-d. It is furthermore apparent from the FIGURE that fastening point S1 is assigned to cylinder walls 3a, b, wherein fastening point S2 is assigned to cylinder walls 3c, d. Knock sensor 10a is thus assigned to cylinders 4a, b, wherein knock sensor 10b is assigned to cylinders 4c, d. At least or precisely one sound transmission bridge 13a-d is provided for each cylinder wall 3a-d. Due to the fact that respective intermediate space Z1 or Z2 is provided between respective outer circumferential-side shell surface 6 and respective fastening point S1 or S2, a respective distance A running in the radial direction of respective cylinder 4a-d is provided in the radial direction of respective cylinder 4a-d between respective cylinder wall 3a-d or between respective outer circumferential-side shell surface 6 and respective fastening point S1 or S2. Respective sound transmission bridge 13a-d extends from respective cylinder wall 3a-d, in particular from respective outer circumferential-side shell surface 6, continuously up to respective fastening point S1 or S2 in respective intermediate space Z1 or Z2 while bridging respective distance A. Vibrations, on the basis of which knocking combustions which occur in respective cylinder 4a-d can be detected by means of respective knock sensor 10a, b, can be transmitted from respective cylinder wall 3a-d to respective fastening point S1 or S2 and thus to knock sensors 10a, b via respective sound transmission bridge 13a-d. As a result, knocking combustions can be detected particularly precisely by means of knock sensors 10a, b. Fastening points S1 and S2 and thus knock sensors 10a, b can simultaneously be positioned particularly advantageously, i.e. arranged at such advantageous positions that knock sensors 10a, b can be mounted easily and thus in a timely and cost-effective manner.

It is furthermore provided that respective, complete outer circumferential-side shell surface 14 of respective sound transmission bridge 13a-d apart from respective sub-regions, in which respective sound transmission bridge 13a-d is coupled in a sound-transmitting manner to respective cylinder wall 3a-d and to housing element 2, is spaced apart both from cylinder wall 3a-d and from housing element 2, as a result of which particularly advantageous sound and/or vibration transmission can be realized between knock sensors 10a, b and cylinder walls 3a-d. Respective sound transmission bridge 13a-d furthermore has a straight-line profile over its entire extent running from respective cylinder wall 3a-d to respective fastening point S1 or S2.

It is apparent from the FIGURE that knocking combustions in cylinders 4a, b can be detected by means of knock sensor 10a, wherein knocking combustions in cylinders 4c, d can be detected by means of knock sensor 10b. As a result of this, the number of parts and thus the costs, the weight and the installation space requirement of internal combustion engine 1 can be kept to a particularly low level.

Respective screw boss 11a, b forms a respective screw-on and thus linking point in which respective knock sensor 10a, b is linked to housing element 2. Sound transmission bridges 13a, d enable an at least substantially direct transmission of sound between the screw points and cylinder walls 3a, d so that knocking events can be detected particularly precisely and at an early stage by means of knock sensors 10a, b. As a result of this, internal combustion engine 1 can be operated with particularly early ignition times, in particular with particularly early ignition angles, without undesirable damage to internal combustion engine 1 occurring. As a result, a particularly efficient and thus low fuel consumption operation of internal combustion engine 1 can be ensured.

LIST OF REFERENCE NUMBERS

1 Internal combustion engine
2 Housing element
3a-d Cylinder wall
4a-d Cylinder
5 Inner circumferential-side shell surface
6 Outer circumferential-side shell surface
7 Double arrow
8 Double arrow
9 Track
10a, b Knock sensor
11a, b Screw boss
12 Side
13a-d Sound transmission bridge
14 Outer circumferential-side shell surface
A Distance
S1 Fastening point
S2 Fastening point
Z1 Intermediate space
Z2 Intermediate space

What is claimed is:

1. An internal combustion engine for a motor vehicle, comprising:
    at least one cylinder wall forming a cylinder; and
    at least one knock sensor that detects knocking combustions occurring in the cylinder, the knock sensor being help on a housing element of the internal combustion engine, wherein
        the knock sensor is fastened to a fastening point of the housing element,
        an intermediate space and, as a result, a distant running at least in a radial direction of the cylinder, are provided in the radial direction between at least one sub-region of the cylinder wall and the fastening point of the housing element arranged on a side of the cylinder wall facing away from the cylinder;
        at least one sound transmission bridge which extends continuously up to the fastening point in the intermediate space while bridging the distance from the cylinder wall, via which sound transmission bridge vibrations, on the basis of which knocking combustions occurring in the cylinder are detectable by the knock sensor, are transmitted from the cylinder wall to the fastening point,
        a center of the fastening point forms an endpoint of a longitudinal axis of the at least one sound transmission bridge; and
    the longitudinal axis is parallel to the radial direction of the cylinder, wherein
    the intermediate space is at least a part of a cooling jacket through which a cooling fluid flows to cool the cylinder wall.

2. The internal combustion engine as claimed in claim 1, wherein
    the housing element is formed as a crank housing of the internal combustion engine.

3. A motor vehicle comprising at least one internal combustion engine as claimed in claim 1.

4. The internal combustion engine as claimed in claim 1, wherein
    the sound transmission bridge is formed in one piece with at least one of the cylinder wall or the housing element.

5. The internal combustion engine as claimed in claim 1, wherein
    the sound transmission bridge has at least one length region, an outer circumferential-side shell surface of which is spaced apart in the circumferential direction of the sound transmission bridge fully circumferentially from the housing element and from the cylinder wall.

6. The internal combustion engine as claimed in claim 1, wherein
    the sound transmission bridge runs in a straight line over its complete extent extending from the cylinder wall to the fastening point.

7. An internal combustion engine for a motor vehicle, comprising:
    at least one cylinder wall forming a cylinder; and
    at least one knock sensor that detects knocking combustion occurring in the cylinder the knock sensor being held on a housing element of the internal combustion engine wherein
        the knock sensor is fastened to a fastening point of the housing element,
        an intermediate space and, as a result, a distance running at least in a radial region of the cylinder wall and the fastening point of the housing element arranged on a side of the cylinder wall facing away from the cylinder;
        at least one sound transmission bridge which extends continuously up to the fastening point in the intermediate space while bridging the distance from the cylinder wall, via which sound transmission bridge vibrations, on the basis of which knocking combustions occurring in the cylinder are detectable by the knock sensor, are transmitted from the cylinder wall to the fastening point;
    at least one sound transmission bridge; and
    the longitudinal axis is parallel to the radial direction of the cylinder, and
    a second cylinder wall forming a second cylinder, wherein
        a second intermediate space is provided in the radial direction of the second cylinder between at least a second sub-region of the second cylinder wall and the fastening point of the housing element arranged on a side of the second cylinder wall facing away from the second cylinder, and, as a result, a second distance running at least in the radial direction of the second cylinder is provided; and at least a second sound transmission bridge extends in the second intermediate space, while bridging the second distance, from the second cylinder wall continuously up to the fastening point, via which second sound transmission bridge vibrations are transmitted from the second cylinder wall to the fastening point, on the basis of which vibrations knocking combustions which occur in the second cylinder are detectable by the knock sensor.

8. The internal combustion engine as claimed in claim 7, wherein
the first and second intermediate spaces are fluidically connected to one another and are respective parts of the cooling jacket.

9. The internal combustion engine as claimed in claim 7, wherein
the housing element is formed as a crank housing of the internal combustion engine.

10. A motor vehicle comprising at least one internal combustion engine as claimed in claim 7.

11. The internal combustion engine as claimed in claim 7, wherein
the sound transmission bridge is formed in one piece with at least one of the cylinder wall or the housing element.

12. The internal combustion engine as claimed in claim 7, wherein
the sound transmission bridge has at least one length region, an outer circumferential-side shell surface of which is spaced apart in the circumferential direction of the sound transmission bridge fully circumferentially from the housing element and from the cylinder wall.

13. The internal combustion engine as claimed in claim 7, wherein
the sound transmission bridge runs in a straight line over its complete extent extending from the cylinder wall to the fastening point.

* * * * *